UNITED STATES PATENT OFFICE.

EDWARD H. KRAMER, OF CLEVELAND, OHIO.

PROCESS OF REMOVING THE COATING FROM GALVANIZED IRON.

1,315,779. Specification of Letters Patent. Patented Sept. 9, 1919.

No Drawing. Application filed December 20, 1916. Serial No. 137,969.

*To all whom it may concern:*

Be it known that I, EDWARD H. KRAMER, a citizen of the United States, residing at Cleveland, in the county of Cuyahoga and State of Ohio, have invented a certain new and useful Improvement in Processes of Removing the Coating from Galvanized Iron, of which the following is a full, clear, and exact description.

The object of this invention is to provide an effective process which may be cheaply put into practice and easily carried out for removing the zinc spelter coating of galvanized iron. A further object is to provide a process which may so thoroughly clean the coating from the iron that it has full value as iron scrap and may be melted in suitable furnaces with other flux or by itself.

It is a very extensive commercial practice to coat iron, particularly sheet iron, with zinc, by first removing all traces of oxidization, which is usually done by a sulfuric acid bath, and then plunging the iron so treated into a bath of melted zinc, usually mixed with other substances, such as sal ammoniac, or mercury and potassium. Heretofore after such metals have served their purpose, they have been thrown away as worthless, no practical method being known for removing and saving the zinc, or for removing the zinc to leave suitable iron scrap. It is well known that the zinc and other materials used for coating the iron would be very detrimental in a furnace, both to the furnace and the resulting metal.

Several methods for recovering the galvanized iron scrap, to use either the iron or the zinc, have been tried, such as dissolving the zinc with sulfuric or muriatic acids, but the expense of such process is so very high as to be commercially prohibitive, as the cost of recovering this scrap is more than its resultant value. Another method (sometimes used where the weight of the iron in proportion to the zinc coating is very large, as in heavy castings), the galvanized material has been placed in a furnace and heat applied to melt the zinc, allowing it to run off. This process is also too costly to be commercially practical, as it requires so much handling of the material; only a comparatively small amount can be placed in the furnace at one time, and a considerable period of time is required to entirely melt the spelter coating, and the coating thus melted is apt to be caught and retained in crevices or recesses in the material, thus defeating the object. By my process I am enabled to avoid the difficulties and objections of processes such as referred to, and to remove the zinc coating from the iron, entirely cleaning the same, leaving clean iron scrap worth as much per ton as iron scrap not so coated, and I also recover the zinc in a form which is in itself valuable.

I have discovered that a mixture of nutro sulfo and niter cake dissolved in water, forms a powerful re-agent which quickly removes zinc coating from galvanized iron dipped into this solution.

The nutro-sulfo which forms about one quarter of the mixture consists of chlorin, calcium hydrogen and oxygen and may be made by mixing together equal parts of chlorin and calcium hydrate.

The niter cake, forming about three-fourths of the mixture, has substantially the following formula:

| | |
|---|---|
| Sodium acid sulfate ($NaHSO_4$) | 78% |
| Sodium sulfate ($Na_2SO_4$) | 18% |
| Water ($H_2O$) | 4% |
| Iron Sulfate ($FeSO_4$) | Trace |

In carrying out my process I dissolve in a large tank of hot water, quantities of nutro sulfo and niter cake, preferably in proportions of about one fourth nutro sulfo and three fourths niter cake, and use approximately one ton of these ingredients for twenty-five tons of galvanized iron sheets. The galvanized scrap is then dipped into the solution in the tank in any convenient manner, as by filling cages or baskets with the scrap and agitating the same in the solution for a short time, during which the zinc coating, with other ingredients which may be mixed therewith, is entirely removed. The scrap material so treated then becomes valuable as scrap iron, and after treating certain quantities of this material the water is drained off, and zinc oxid, which is formed in the process and settles to the bottom of the tank, is removed. This zinc oxid is also valuable.

As previously stated, my process is capable of being very easily carried out. The materials used are comparatively cheap. This is particularly true of niter cake, which is a by-product in the manufacture of gunpowder, comparatively small quantities of these materials being capable of acting on large amounts of galvanized scrap, and this re-agent is easily handled, as it is not dangerous to workmen, having practically no effect when coming in contact with the skin. A feature of this process is that the materials treated are thoroughly cleaned of their coating, the liquid entirely washing off any salammoniac or mercury and potassium which may be in the coating, and also the re-agent used in this manner has the advantage of reaching and cleaning every part of the materials treated.

Having thus described my invention, what I claim is:

1. The process of removing the coating from galvanized iron, consisting of dipping the iron into a re-agent comprising water, a neutral substance containing sulfur and a nitric salt.

2. The process of removing zinc coating and other materials from galvanized iron, consisting of dissolving in water nutro sulfo and a nitric salt, and agitating the materials to be treated within such solution for a short time and then removing the same therefrom.

3. The process of recovering the materials of galvanized iron, consisting of bathing the materials in a re-agent comprising nutro sulfo and niter cake dissolved in water, the nutro sulfo and niter cake being in proportions of one fourth and three fourths respectively.

4. The process of treating galvanized iron to render the same commercially useful, consisting of dissolving in water nutro sulfo and niter cake, bathing the materials to be treated in such solution, removing the same therefrom, drawing off the water, and collecting the deposit of zinc oxid.

In testimony whereof I hereunto affix my signature.

EDWARD H. KRAMER.

Copies of this patent may be obtained for five cents each, by addressing the "Commissioner of Patents, Washington, D. C."